United States Patent [19]  
Tomita

[11] Patent Number: 4,538,468  
[45] Date of Patent: Sep. 3, 1985

[54] ELECTROMAGNETIC FLOWMETER

[75] Inventor: Toyofumi Tomita, Tokyo, Japan

[73] Assignee: Tokyo Shibaura Denki Kabushiki Kaisha, Kawasaki, Japan

[21] Appl. No.: 589,719

[22] Filed: Mar. 15, 1984

[30] Foreign Application Priority Data

Mar. 23, 1983 [JP] Japan .................. 58-48132

[51] Int. Cl.³ .............................................. G01F 1/60
[52] U.S. Cl. ................................................. 73/861.17
[58] Field of Search ....................... 73/861.16, 861.17

[56] References Cited

U.S. PATENT DOCUMENTS 4,117,721 10/1978 Suzuki et al. ................ 73/861.16
4,206,641 6/1980 Takada .
4,227,408 10/1980 Schmock et al. ............ 73/861.17
4,296,636 10/1981 Mannherz ................... 73/861.17

FOREIGN PATENT DOCUMENTS 2084740 4/1982 United Kingdom .

Primary Examiner—Herbert Goldstein  
Attorney, Agent, or Firm—Oblon, Fisher, Spivak, McClelland & Maier

[57] ABSTRACT

An electromagnetic flowmeter includes a flow rate detecting circuit; an exciting circuit for supplying an exciting current to this flow rate detecting circuit; a signal processing section for sampling an output signal from the flow rate detecting circuit and smoothing this sampled output signal; and a signal generating circuit for supplying a sampling signal and an excitation control signal to the exciting circuit and the signal processing section, respectively. This signal generating circuit supplies a sampling signal having the frequency which is apart by a range of 0.5 to 10% from the frequency of the commercial power source to the signal processing section.

7 Claims, 20 Drawing Figures

ELECTROMAGNETIC FLOWMETER

BACKGROUND OF THE INVENTION

The present invention relates to an electromagnetic flowmeter adopting a square wave exciting method for measuring the flow rate of a fluid.

In conventional electromagnetic flowmeters by the square wave exciting method, the square wave current having a low frequency which is an even fraction or even submultiple of the commercial AC power frequency is allowed to flow through an exciting coil of a flow rate detector and the induced voltage to be caused across a pair of electrodes disposed in the fluid flow is sampled, thereby obtaining a so-called flow rate signal including no 90° noise and no in-phase noise. In the electromagnetic flowmeter of this kind, no zero point fluctuation occurs and its operation is stable.

FIG. 1 shows a conventional electromagnetic flowmeter adopting the square wave exciting method. This electromagnetic flowmeter includes a flow rate detector 10 to detect the flow rate of a conductive fluid, and a signal processor 20 to generate a flow rate signal in proportion to the flow rate by processing an output signal of this flow rate detector 10. This flow rate detector 10 includes a tube 11 for allowing the conductive fluid to pass, a pair of electrodes 12 and 13 which are so disposed as to face each other in this tube 11, and a pair of exciting coils 14 and 15 for generating a magnetic flux crossing the tube 11. On the other hand, the signal processor 20 includes a signal source 21 having the commercial power frequency, an excitation control circuit 22 for generating a square wave sampling signal by shaping the waveform of the signal from this signal source 21 and for frequency-dividing this sampling signal, thereby generating an excitation control signal having a frequency equal to an even fraction of the commercial power frequency, an exciting circuit 23 to alternately supply two constant currents having the different polarities or magnitudes from each other to the exciting coils 14 and 15 in response to the excitation control signal from this excitation control circuit 22, an amplifier/inverter circuit 24 for amplifying the voltage to be induced between the electrodes 12 and 13 and inverting the amplified voltage at every half cycle, a sampling circuit 25 to sample an output signal from this circuit 24 in response to a sampling signal from the control circuit 22, and a converting circuit 26 for converting the signal sampled by the sampling circuit 25 into the DC current in a ragne of 4 to 20 mA, thereby generating a flow rate signal proportional to the flow rate.

FIG. 2 shows a practical circuit diagram of the sampling circuit 25. This sampling circuit 25 has an integrating circuit 25A to integrate the signal to be supplied from the amplifier circuit 24 through a switch 25B and a resistor 25C, and a flip-flop 25D (set input high priority) for receiving at its reset input terminal an output signal of the integrating circuit 25A through a comparator 25E. A Q output terminal of the flip-flop 25D is coupled to one input terminal of an AND gate 25F which receives at the other input terminal the sampling signal from the excitation control circuit 22 through an inverter 25G. In addition, the sampling signal from the excitation control circuit 22 is supplied to a set input terminal of the flip-flop 25D. A switch 25H and a reference voltage source 25I are coupled between the ground and the junction between the switch 25B and the resistor 25C. The switches 25B and 25H are controlled by the sampling signal from the excitation control circuit 22 and an output signal from the AND gate 25F, respectively.

In the electromagnetic flowmeter shown in FIGS. 1 and 2, the signal of the commercial power frequency shown in FIG. 3A is supplied from the signal source 21 to the excitation control circuit 22. This control circuit 22 shapes the waveform of this input signal and generates the square wave sampling signal having a frequency equal to the commercial power frequency shown in FIG. 3B, and at the same time, it frequency-divides this sampling signal and generates the excitation control signal shown in FIG. 3C having the frequency equal to an even fraction, e.g., ½ of the commercial power frequency. The exciting circuit 23 selectively supplies two constant currents having different polarities or magnitudes to the exciting coils 14 and 15 in accordance with the low or high level of this excitation control signal. Due to this, the alternating magnetic flux is generated between the exciting coils 14 and 15, thereby causing the induced voltage to be generated between the electrodes 12 and 13. This induced voltage is amplified by the amplifier/inverter circuit 24 and is inverted at every half cycle and is supplied to the sampling circuit 25 as the signal voltage shown in FIG. 3D. The sampling circuit 25 samples the output voltage from the amplifier/inverter circuit 24 in response to the leading edge of the sampling signal shown in FIG. 3B, i.e., at a timing when the alternating magnetic field is stable, thereby generating an output voltage in proportion to the flow rate. The voltage sampled in this way is smoothed by the converting circuit 26 and thereafter it is converted into the DC current in a range of 4 to 20 mA.

When the sampling signal at a high level shown in FIG. 3B is supplied from the excitation control circuit 22 to the sampling circuit 25, the switch 25B is closed for the interval corresponding to one cycle of the commercial power frequency, so that the output voltage shown in FIG. 3D from the amplifier/inverter circuit 24 is supplied to the integrating circuit 25A. Due to this, this integrating circuit 25A integrates the output voltage from the circuit 24 for the interval corresponding to one cycle of the commercial power frequency, thereby generating the output voltage which monotonously increases as shown in FIG. 3E. This output voltage of the integrating circuit 25A is supplied through the comparator 25E to the reset input terminal of the flip-flop 25D. Thereafter, when the sampling signal becomes a low level, the flip-flop 25D is set and a high level signal is generated from the AND gate 25F, thereby closing the switch 25H. Due to this, the voltage of the opposite polarity to that of the output voltage from the circuit 24 is supplied from the reference voltage source 25I to the integrating circuit 25A. While the integrating circuit 25A is integrating the output voltage from this reference voltage source 25I, the output voltage of the integrating circuit 25A gradually decreases as shown in FIG. 3E. When it is detected that the output voltage of the integrating circuit 25A has reached the 0 level, the comparator 25E generates an output signal to reset the flip-flop 25D. This allows a low level signal to be generated from the AND gate 25F, thereby turning off the switch 25H. As is well known, the time when the switch 25H is closed is proportional to the level of the output voltage of the circuit 24, while it is inversely proportional to the output voltage level of the reference voltage source 25I. Since the output voltage level of the reference voltage source 25I is constant, it is possible to derive an output signal of the AND gate 25F representing the interval during which the switch 25H is closed as the flow rate signal having a pulse width proportional to the flow rate.

In the above-mentioned electromagnetic flowmeter, since the frequency of the excitation control signal is different from the commercial power frequency, the influence of the noise due to the commercial power source can be minimized. In addition, since the integration sampling interval is set to be equal to one cycle of the commercial power frequency, even if the noise due to the commercial power source is mixed to the flow rate signal as shown in, for example, FIG. 3F, the noise component is eliminated by integrating this signal, so that the influence to the flow rate signal due to the mixture of this noise is minimized.

On the other hand, in the case where the signal source 21 having the commercial power frequency is used to obtain the excitation control signal, the flow rate cannot be measured in case of the failure of power supply. In addition, in case of the occurrence of the instantaneous stoppage of power supply, the exciting cycle and the sampling timing fluctuate, so that this causes a measurement error to be produced. Moreover, the fluctuation of the power frequency influences frequency characteristic of the amplifier to cause a measurement error to be produced.

Therefore, conventionally, a DC driving method is adopted and an oscillating circuit for generating an oscillation signal having the oscillating frequency which is equal to the commercial power frequency and an auxiliary power supply are used.

When other electric power equipment, cables and the like are disposed near the electromagnetic flowmeter, in many cases, the induced noise due to the commercial power source is mixed into an output signal from the flow rate detector 10. In this case, if this commercial power frequency is exactly equal to the oscillating frequency of the oscillating circuit, no particular problem will be caused. However, the commercial power frequency fluctuates in a range of, for example, 48 to 52 Hz in dependance upon the districts or countries. Consequently, it is actually impossible to set the oscillating frequency of the oscillating circuit to be always equal to the commercial power frequency and it is also difficult to make the sampling interval correspond to one cycle of the commercial power frequency. Therefore, in case of using the oscillating circuit, it is difficult to efficiently eliminate the induced noise due to the commercial power source, so that it is difficult to accurately measure the flow rate.

SUMMARY OF THE INVENTION

It is an object of the present invention to provide an electromagnetic flowmeter which can minimize the influence of the noise due to the commercial power source and can measure the flow rate with high degree of accuracy.

This object is accomplished by an electromagnetic flowmeter comprising a flow rate detecting section for detecting the flow rate of a conductive fluid, an exciting circuit for supplying an exciting current to this flow rate detecting section, a signal processing section for sampling an output signal from the flow rate detecting section and for smoothing this sampled signal, and a signal generating circuit for supplying a sampling signal having the frequency which is apart from the commercial power frequency by 0.5 to 10% to this signal processing section and for supplying an excitation control signal having the frequency equal to an even fraction of the frequency of this sampling signal to the exciting circuit.

In this invention, since the frequency of the sampling signal to be generated from the signal generating circuit is set to be apart from the commercial power frequency by 0.5 to 10%, even if the noise due to the commercial power source is mixed to the flow rate signal from the flow rate detecting section, it is possible to satisfactorily eliminate the mixed noise component by smoothing this flow rate signal in the signal processing section.

DETAILED DESCRIPTION OF THE PREFERRED EMBODIMENT

Figure 1:
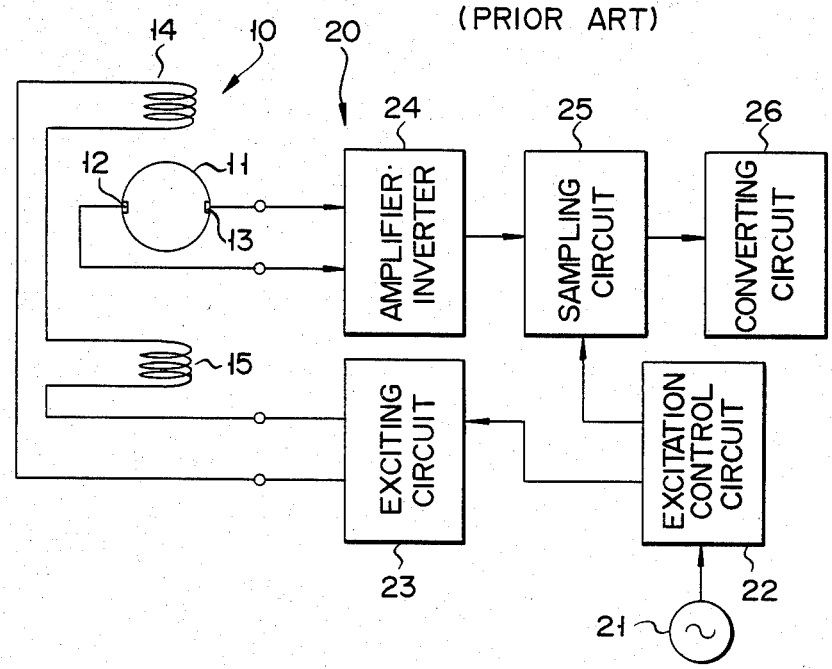
FIG. 1 shows a conventional electromagnetic flowmeter to be driven by the commercial power source.
Figure 4:
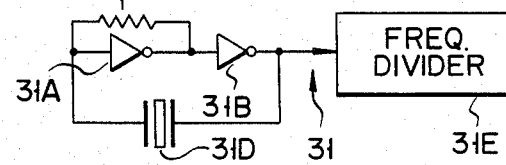
FIG. 4 shows an electromagnetic flowmeter having an oscillating circuit which oscillates at a frequency different from the commercial power frequency according to one embodiment of the present invention.

FIG. 4 shows an electromagnetic flowmeter according to one embodiment of the present invention. This electromagnetic flowmeter is constituted similarly to that shown in FIG. 1 except that an oscillating circuit 32 and an excitation control circuit 32 are used in place of the signal source 21 and the excitation control circuit 22. This oscillating circuit 31 includes an astable multivibrator which is constituted by inverters 31A and 31B which are connected in series, a resistor 31C and a crystal resonator 31D, and a frequency divider 31E for frequency-dividing an oscillation output signal from this astable multivibrator, thereby supplying an output signal of the frequency having the difference in a range of 0.5 to 10% with respect to the commercial power frequency to the excitation control circuit 32.

In the electromagnetic flowmeter shown in FIG. 4, it is now assumed that the noise due to the commercial power source is mixed into the signal in proportion to the flow rate which is derived from between the pair of electrodes 12 and 13. In this case, a signal $E_3$ of which a noise component $E_2 \sin \omega t$ (where, $\omega$: angular frequency of the commercial power source) is superimposed on a flow rate signal component $E_1$ is generated from the amplifier/inverter circuit 24. Namely, $E_3$ is represented by the following expression:

$$E3 = E1 + E2 \sin \omega t \qquad (1)$$

Figure 2:
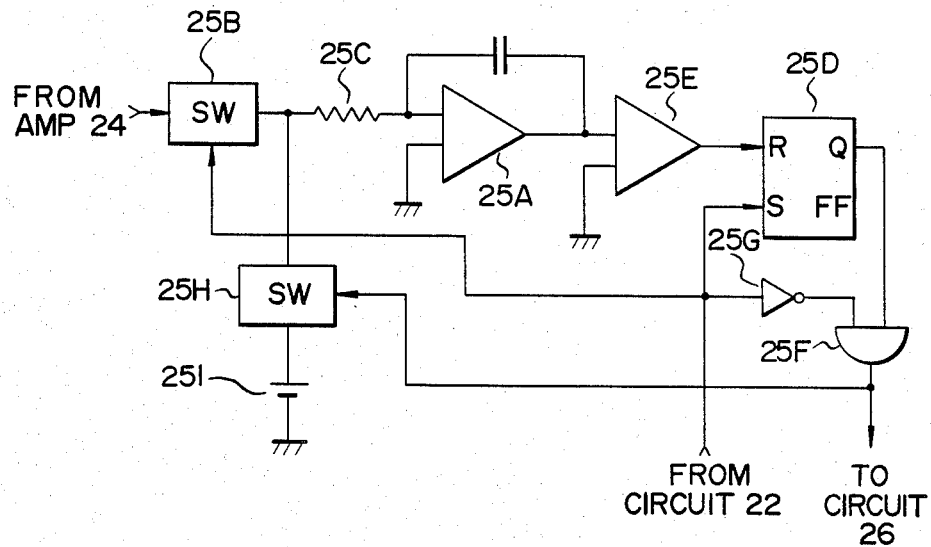
FIG. 2 shows a circuit diagram of a sampling circuit in the electromagnetic flowmeter shown in FIG. 1.
Figure 3:
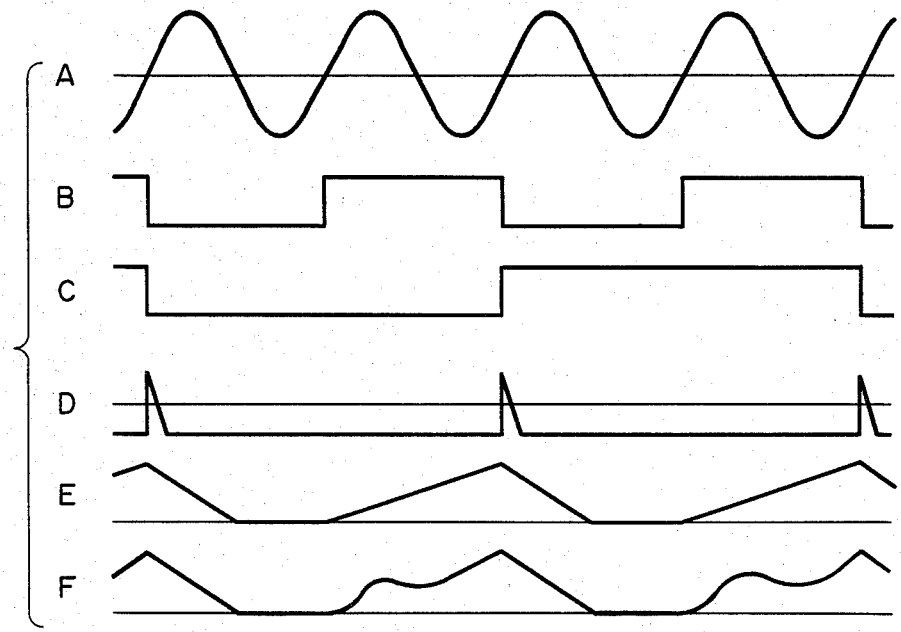
FIGS. 3A to 3F show signal waveform diagrams for illustrating the operation of the electromagnetic flowmeter shown in FIGS. 1 and 2.
Figure 3:
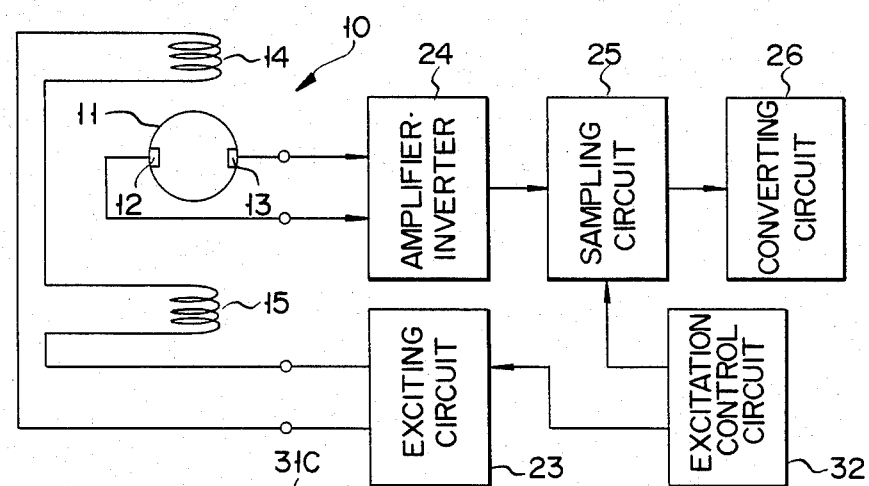

Now, assuming that the integrating circuit 25A (FIG. 2) in the sampling circuit 25 integrates the input signal E3 for a sampling interval T to be determined in dependence upon the oscillation frequency of the oscillating circuit 31 from time t1, an integration output signal E4 to be given by the following expression will be generated from the integrating circuit 25A.

$$E4 = \int_{t1}^{t1+T} \frac{1}{CR}(E1 + E2 \sin \omega t)dt \qquad (2)$$

$$= \frac{E1}{CR} \cdot T - \frac{E2}{\omega CR}\{\cos(\omega T + \omega t1) - \cos \omega t1\}$$

In the expression (2), if it is possible to set that $T=2\pi/\omega$, i.e., to set the sampling interval T to be equal to one cycle of the commercial power frequency, the second term of the right side of this expression (2) will be 0, so that it is possible to completely eliminate the noise component $E2 \sin \omega t$ which is mixed into the flow rate signal component E1. However, actually, since the commercial power frequency fluctuates, it is impossible to set that $T=(2\pi/\omega)$; therefore, the second term of the right side of expression (2) cannot be ignored.

Now, assuming that $T=2\pi/(\omega+\Delta\omega)$, the second term N of the right side of expression (2) will be given by the following expression:

$$N = \frac{E2}{\omega CR}\{\cos(\omega T + \omega t1) - \cos \omega t1\} \qquad (3)$$

$$= \frac{E2}{\omega CR} \cdot \sin \frac{\omega T}{2} \cdot \sin\left(\frac{\omega T}{2} + \omega t1\right)$$

$$= \frac{E2}{\omega CR} \cdot \sin\left(\frac{\omega}{2} \cdot \frac{2\pi}{\omega + \Delta\omega}\right) \cdot \sin\left(\frac{\omega T}{2} + \omega t1\right)$$

$$\approx \frac{E2}{\omega CR} \cdot \sin\left(\pi - \frac{\Delta\omega}{\omega}\pi\right) \cdot \sin\left(\frac{\omega T}{2} + \omega t1\right)$$

$$= -\frac{E2}{\omega CR} \cdot \sin\left(\frac{\Delta\omega}{\omega}\pi\right) \cdot \sin\left(\frac{\omega T}{2} + \omega t1\right)$$

When it is assumed that time t1 is the start time of the sampling cycle at the n-th time (where, n is a positive integer), we will have $t1 = 2nT$ and expression (3) will be further rewritten as the following expression:

$$N = -\frac{E2}{\omega CR} \cdot \sin\left(\frac{\Delta\omega}{\omega}\pi\right) \cdot \sin\left\{(\tfrac{1}{2} + 2n)\frac{2\pi\omega}{\omega + \Delta\omega}\right\} \qquad (4)$$

$$\approx -\frac{E2}{\omega CR} \cdot \sin\left(\frac{\Delta\omega}{\omega}\pi\right) \cdot \sin\left\{(2\pi(\tfrac{1}{2} + 2n)\left(1 - \frac{\Delta\omega}{\omega}\right)\right\}$$

$$= \frac{E2}{\omega CR} \cdot \sin\left(\frac{\Delta\omega}{\omega}\pi\right) \cdot \sin\left\{2\pi(\tfrac{1}{2} + 2n)\frac{\Delta\omega}{\omega}\right\}$$

$$\approx \frac{E2}{\omega CR} \cdot \frac{\Delta\omega}{\omega}\pi \cdot \sin\left(4n\pi\frac{\Delta\omega}{\omega}\right)$$

where, $\Delta\omega/\omega \ll 1$.

where, $\Delta\omega/\omega \gg 1$.

As will be understood from this expression (4), the noise component N is proportional to the difference $\Delta\omega$ between the commercial power frequency and the oscillating frequency and is derived as the beat signal of low frequency to be obtained by multiplying the difference $\Delta\omega$ by the exciting frequency $4n\pi$. In this way, in the case where the commercial power frequency and the oscillating frequency of the oscillating circuit 31 are equal to each other, $\Delta\omega=0$, so that the noise component can be completely eliminated. On the contrary, in the case where the difference $\Delta\omega$ is small, although the amplitude is small, the noise component will remain as the beat signal of extremely low frequency. However, if the difference $\Delta\omega$ has a certain magnitude, the noise will remain as the beat signal having high frequency although it has a large amplitude.

On the other hand, the converting circuit 26 has a first-order lag circuit which ordinarily has time constant of at least one second to smooth the output signal from the sampling circuit 25. Although this first-order lag circuit can attenuate remarkably the high frequency input signal, it can hardly attenuate the low frequency input signal. That is, in the case where the noise component of extremely low frequency having the small difference $\Delta\omega$ is supplied to this first-order lag circuit, this noise component is hardly attenuated, so that it will remain mixed in the flow rate signal component. On the other hand, in the case where the difference $\Delta\omega$ has a certain magnitude and where the noise component having high beat frequency is supplied to this first-order lag circuit, this noise component is remarkably attenuated; therefore, the noise component is eliminated in this first-order lag circuit and the output signal corresponding to the flow rate signal component is obtained.

The influence of this noise component will be described with reference to FIGS. 5A to 5G.

Figure 5A:
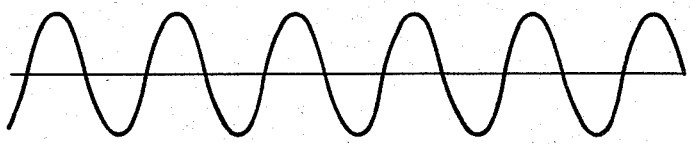
FIGS. 5A to 5G show signal waveform diagrams to describe the operation of the electromagnetic flowmeter shown in FIG. 4.
Figure 5B:
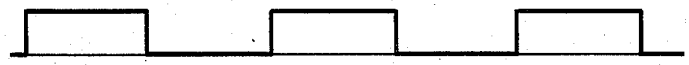
Figure 5C:
Figure 5D:

FIG. 5A shows a waveform diagram of the commercial power voltage of 50 Hz and FIG. 5B is a waveform diagram of the sampling signal whose frequency is set into 49.9 Hz and which is supplied to the sampling circuit 25. In this case, when the output signal of the integrating circuit 25A of the sampling circuit 25 includes no noise component, it increases at a rate responsive to the flow rate as indicated by the broken lines in the diagrams. However, in the case where the noise due to the comercial power source is mixed, the output signal of which the superimposed value of the flow rate signal component and the noise component is integrated is generated from this integrated circuit 25A, for example, as indicated by the solid lines. In this case, it should be noted that the frequency of the noise component is extremely low since the difference $\Delta\omega$ is small and therefore the influence which the noise component exerts on the integration output signal does not fluctuate for a fairly long time. Namely, for example as shown in FIG. 5C, in the case where there is such a tendency that the noise signal component increases the integration output signal at a certain integration cycle, this tendency does not vary even for a fairly number of subsequent integration cycles, so that the integration output signal is enhanced by the noise component even at these subsequent integration cycles. Therefore, in the case where the output signal from the sampling circuit 25 is smoothed in the converting circuit 26, as shown in FIG. 5D, the output signal at a higher level than the normal level indicated by the broken lines in the diagrams which will be obtained when no noise component is mixed would be obtained.

Figure 5E:
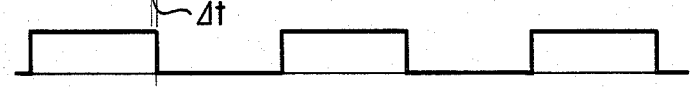
Figure 5F:
Figure 5G:

On the contrary, as shown in FIG. 5E, when the oscillating signal having the frequency of 48 Hz and a period longer than that of the sampling signal shown in FIG. 5B by 2Δt is generated from the oscillating circuit 31, the frequency of the noise component which is included in the integration output signal becomes high since the difference Δω is large. Consequently, as shown in FIG. 5F, the integration output signal becomes large or small for the normal value, for example, at every integraion cycle due to the influence of the noise component. Therefore, in the case where the output signal from the sampling circuit 25 is smoothed in the converting circuit 26, the influences due to the noise components at successive integration cycles may be cancelled, so that the output signal at a level which is almost equal to the normal level is obtained from the converting circuit 26 as shown in FIG. 5G.

Figure 6:
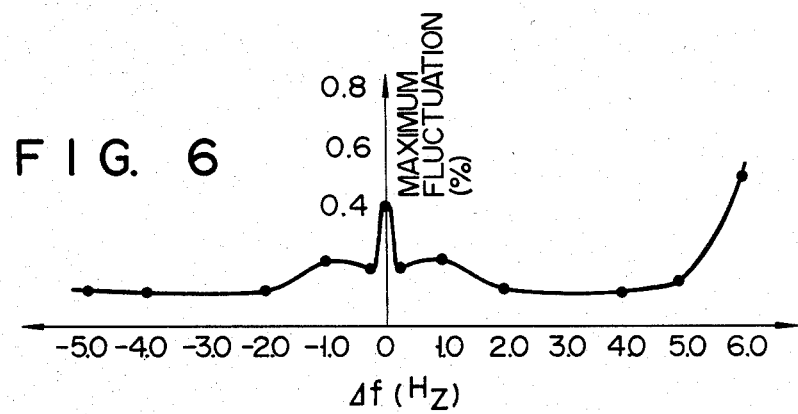
FIG. 6 is a graph showing a change in output current of the electromagnetic flowmeter in the case where the frequency of the oscillating circuit is changed in the electromagnetic flowmeter shown in FIG. 4.

FIG. 6 shows the relation between the maximum fluctuation of the output signal of the converting circuit 26 shown in FIG. 4 with respect to its average level and the difference Δf between the noise frequency and the oscillating frequency in the case where the frequency of the noise due to the commercial power source was set to 50 Hz and a fluid was allowed to flow in the tube 11 at a constant rate and where the oscillating frequency of the oscillating circuit 31 was changed. Also in this case, the frequency of the excitation control signal was set to be ⅛ of the sampling frequency.

As is obvious from this experimental data, when the difference Δf between the oscillating frequency of the oscillating circuit 31 and the noise frequency was set into 0.25 Hz to 5 Hz, namely, in the case where the ratio of the difference Δf to the noise frequency was set into 0.5 to 10%, the maximum fluctuation of the output signal of the converting circuit 26 with respect to its average value is suppressed to less than almost 0.1%, thereby enabling the output signal which is proportional to the flow rate with high degree of accuracy to be generated from the converting circuit 26.

Figure 7A:
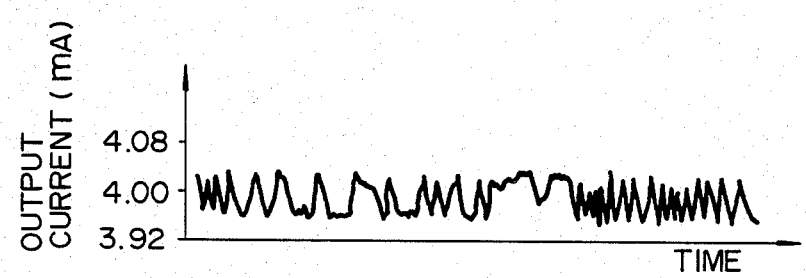
FIGS. 7A and 7B are diagrams which represent the output characteristics of the electromagnetic flowmeters shown in FIGS. 1 and 4, respectively.
Figure 7B:
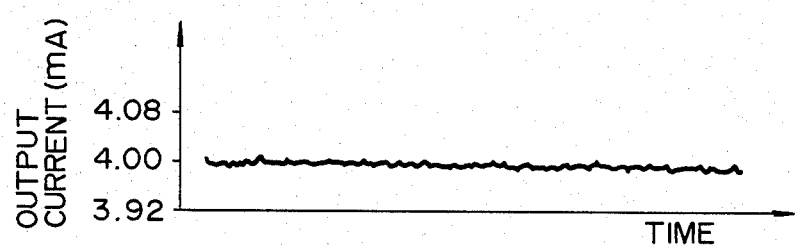

FIGS. 7A and 7B show the results when the DC output current to be supplied from the converting circuit 26 was measured for about two minutes in a scale range of 4 to 20 mA in the case where the commercial power source of 50 Hz is used and where a fluid was allowed to flow in the tube 11 at a constant flow rate. FIG. 7A shows the measurement data when the sampling frequency and the exciting frequency are 50 Hz and 6.25 Hz, respectively. FIG. 7B shows the measurement data obtained in the case where the sampling frequency and the exciting frequency are 48.56 Hz and 6.07 Hz, respectively.

In the example shown in FIG. 7A, the commercial power source frequency fluctuates and has the slight frequency difference for the sampling frequency, so that the DC output curret of the converting circuit 26 would have been largely affected by the noise due to this commercial power source as already described previously. On the other hand, in the example shown in FIG. 7B, since the sampling frequency has been set so as to have the frequency difference of about 1.5 Hz for the commercial power frequency, the influence which the noise due to the commercial power source exerts on the output current of the converting circuit 26 is minimized owing to the reason described before.

Figure 8:
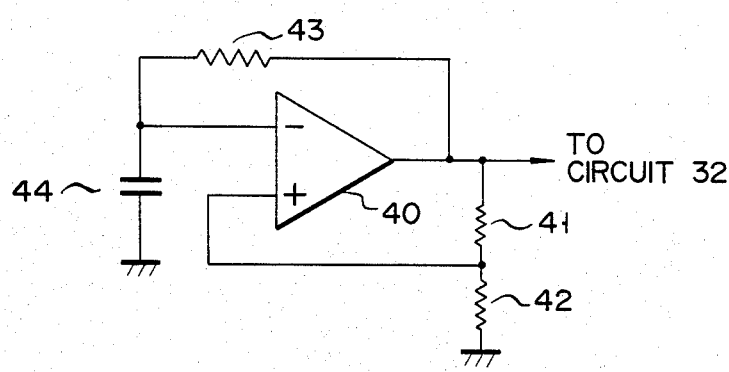
FIG. 8 shows an oscillating circuit which can be used in place of the oscillating circuit shown in FIG. 4.

The present invention has been described above with respect to one embodiment, but the present invention is not limited to only this embodiment. For instance, since the accuracy and stability of the oscillating signal to be applied to the excitation control circuit 32 may not be so high, it is possible to use such an oscillating circuit for example as shown in FIG. 8 in place of the oscillating circuit 31. This oscillating circuit comprises an operation amplifier 40, resistors 41 and 42 which are coupled to series between an output terminal of this operation amplifier 40 and the ground; and a resistor 43 and a capacitor 44 which are coupled in series between the output terminal of the operation amplifier 40 and the ground. The junction between the resistors 41 and 42 is coupled to a non-inverting input terminal of the operation amplifier 40, while the junction between the resistor 43 and the capacitor 44 is coupled to the inverting input terminal of the operation amplifier 40. As is well known, the oscillating frequency of this oscillating circuit can be selectively set by appropriately setting values of the resistors 41, 42 and 43 and a value of the capacitor 44.

Although the oscillation circuit 31 and the excitation control circuit 32 have been constituted separately from each other, these circuits 31 and 32 can be also constituted as a single circuit. For example, it is possible to use a sampling signal generating circuit for generating a sampling signal having the frequency which is apart from the frequency of the commercial power source by m% ($0.5 \leq m \leq 10$), an excitation control signal generating circuit for generating an excitation control signal having the frequency which is apart by m% from the frequency which is equal to an even fraction of the frequency of the commercial power source, and a synchronizing circuit for making these two signal generating circuit operative synchronously.

In addition, although the commercial power frequency has been set into 50 Hz in the above embodiment, it is not limited to this frequency and a similar effect can be obtained even when it is set into any other frequencies, e.g., 60 Hz. Furthermore, although there has been described the case where the frequency of the excitation control signal is set to be ½ or ⅛ of the sampling frequency for the purpose of simplicity of explanation, it may be set to be an even fraction or even submultiple of the sampling frequency other than ½ and ⅛.

As for the output current of the exciting circuit 23, it has been described the case where the current of two values having the different polarities or magnitudes are altenately supplied; however, it is also possible to use an exciting circuit for selectively supplying, for example, currents of three values in place of this exciting circuit 23.

What is claimed is:
1. An electromagnetic flowmeter comprising:
   flow rate detecting means for detecting the flow rate of a conductive fluid;
   exciting means for supplying an exciting current to said flow rate detecting means in response to an excitation control signal;
   signal processing means for sampling an output signal from said flow rate detecting means in response to a sampling signal and for smoothing this sampled signal; and
   signal generating means for supplying a sampling signal to said signal processing means and an exci- tation control signal to said exciting means, said sampling signal having a frequency different from the commercial power frequency by 0.5 to 10%, said excitation control signal having a frequency which is an even fraction of the frequency of said sampling signal.

2. An electromagnetic flowmeter according to claim 1, wherein said signal processing means includes: sampling means for integrating the output signal from said flow rate detecting means in response to the sampling signal from said signal generating means and for generating an output signal in accordance with the flow rate; and means for smoothing an output signal from said sampling means.

3. An electromagnetic flowmeter according to claim 2, wherein said signal generating means includes: an oscillating circuit; and an excitation control circuit for generating the sampling signal and the excitation control signal in response to the output signal of said oscillating circuit.

4. An electromagnetic flowmeter according to claim 3, wherein said oscillating circuit is a crystal oscillating circuit.

5. An electromagnetic flowmeter according to claim 3, wherein said sampling means includes: an amplifier/inverter circuit for amplifying the output signal from said flow rate detecting means and for inverting it at every half cycle; first switching means whose conducting state is controlled in response to the sampling signal from said signal generating means; an integrating circuit for integrating an output signal of said amplifier/inverter circuit to be supplied through said first switching means; means for attenuating an output signal of said integrating circuit at a predetermined rate at the end of each sampling cycle in response to the sampling signal from said signal generating means; and means for generating an output signal when it detects that the output signal of said integrating circuit reached a predetermined level.

6. An electromagnetic flowmeter according to claim 2, wherein said sampling means includes: an amplifier/inverter circuit for amplifying the output signal from said flow rate detecting means and for inverting it at every half cycle; first switching means whose conducting state is controlled in response to the sampling signal from said signal generating means; an integrating circuit for integrating an output signal of said amplifier/inverter circuit to be supplied through said first switching means; means for attenuating an output signal of said integrating circuit at a predetermined rate at the end of each sampling cycle in response to the sampling signal from said signal generating means; and means for generating an output signal when it detects that the output signal of said integrating circuit reached a predetermined level.

7. An electromagnetic flowmeter according to claim 1, wherein said signal generating means includes: an oscillating circuit; and an excitation control circuit for generating the sampling signal and the excitation control signal in response to the output signal of said oscillating circuit.

* * * * *